No. 849,021. PATENTED APR. 2, 1907.
S. O. RICHARDSON, Jr.
GLASS FURNACE.
APPLICATION FILED JULY 2, 1904.
4 SHEETS—SHEET 3.
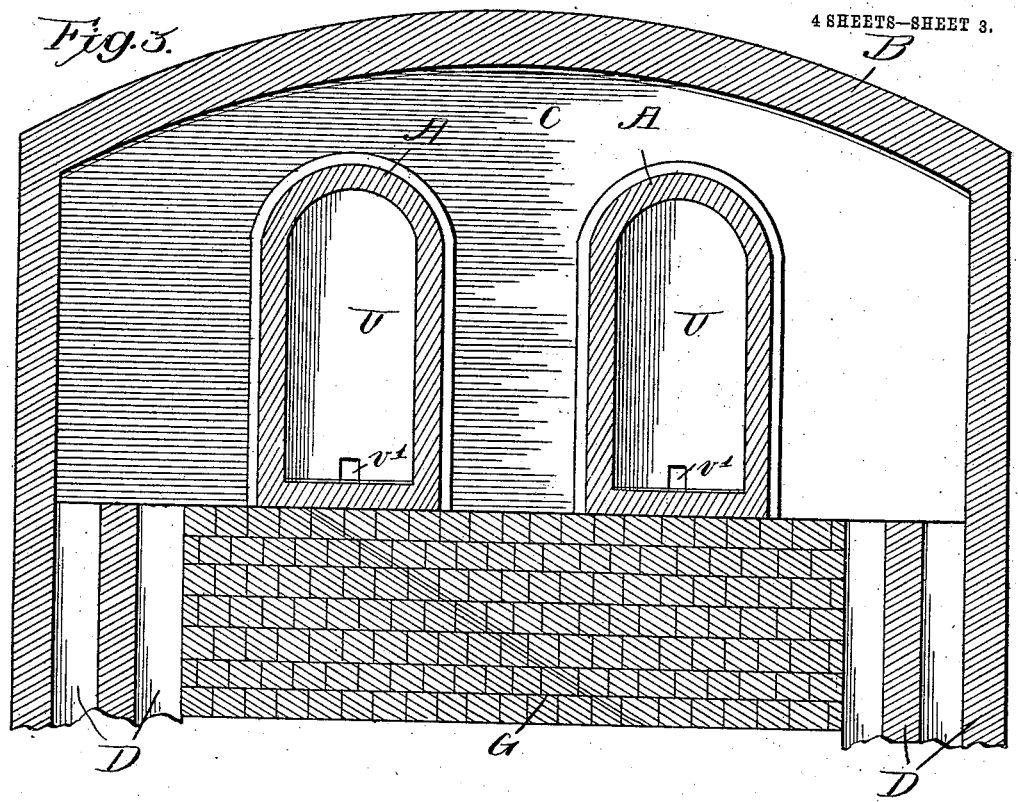
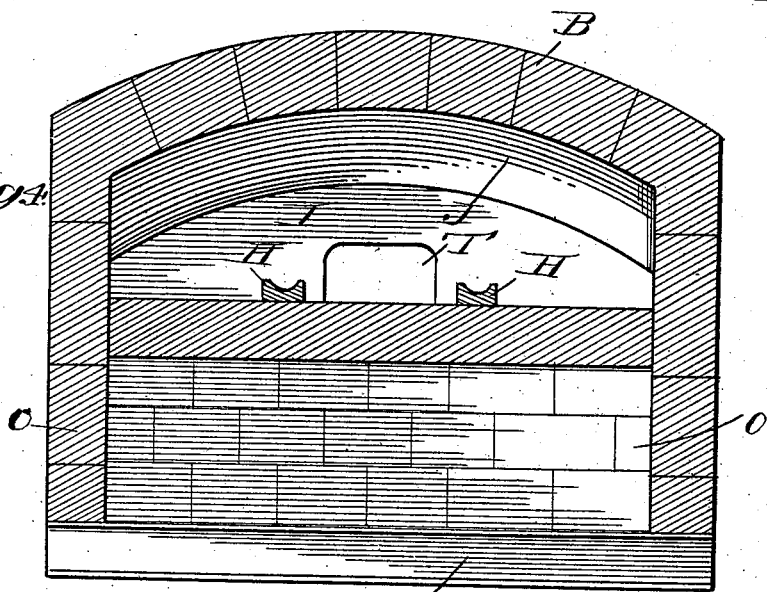

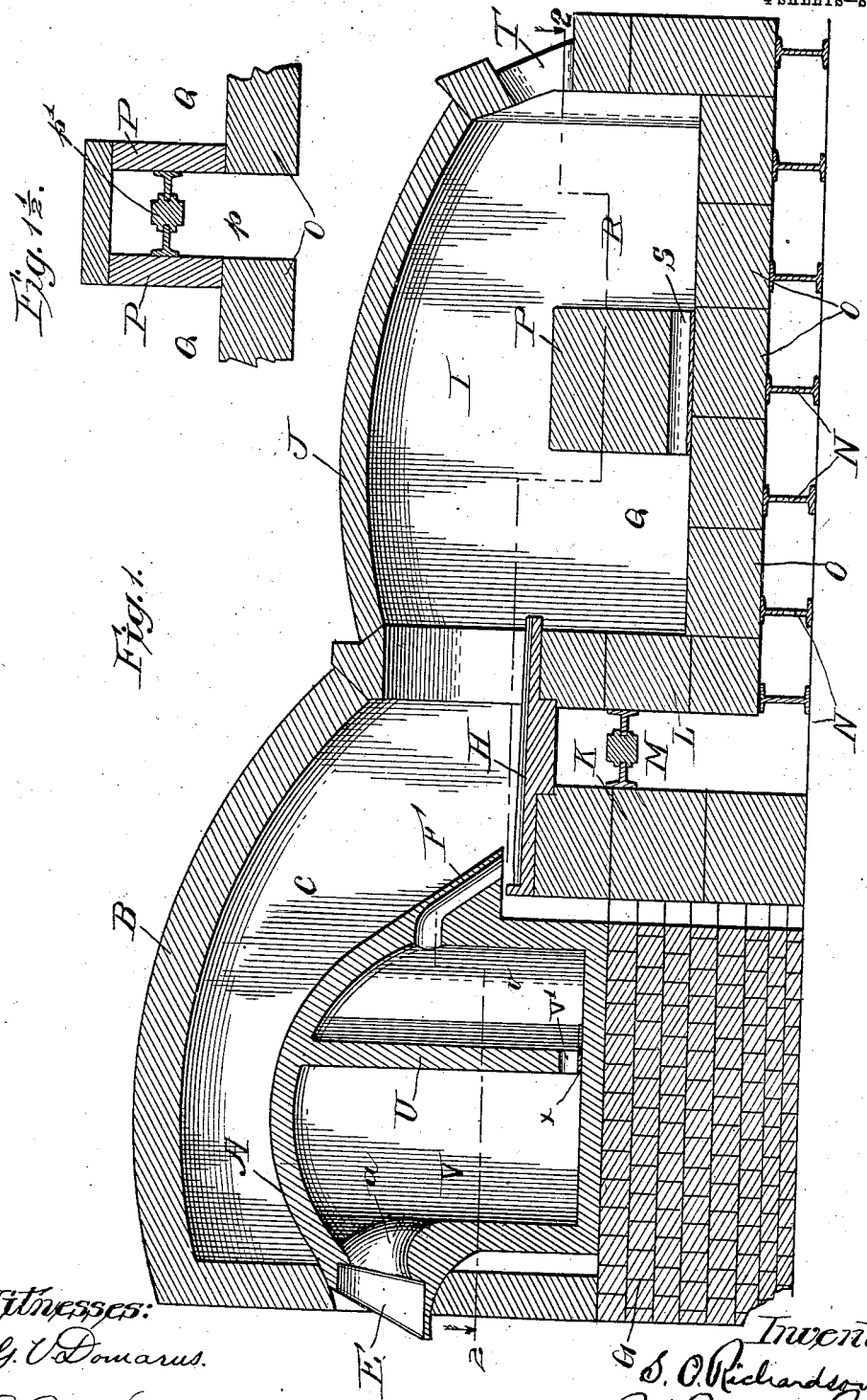

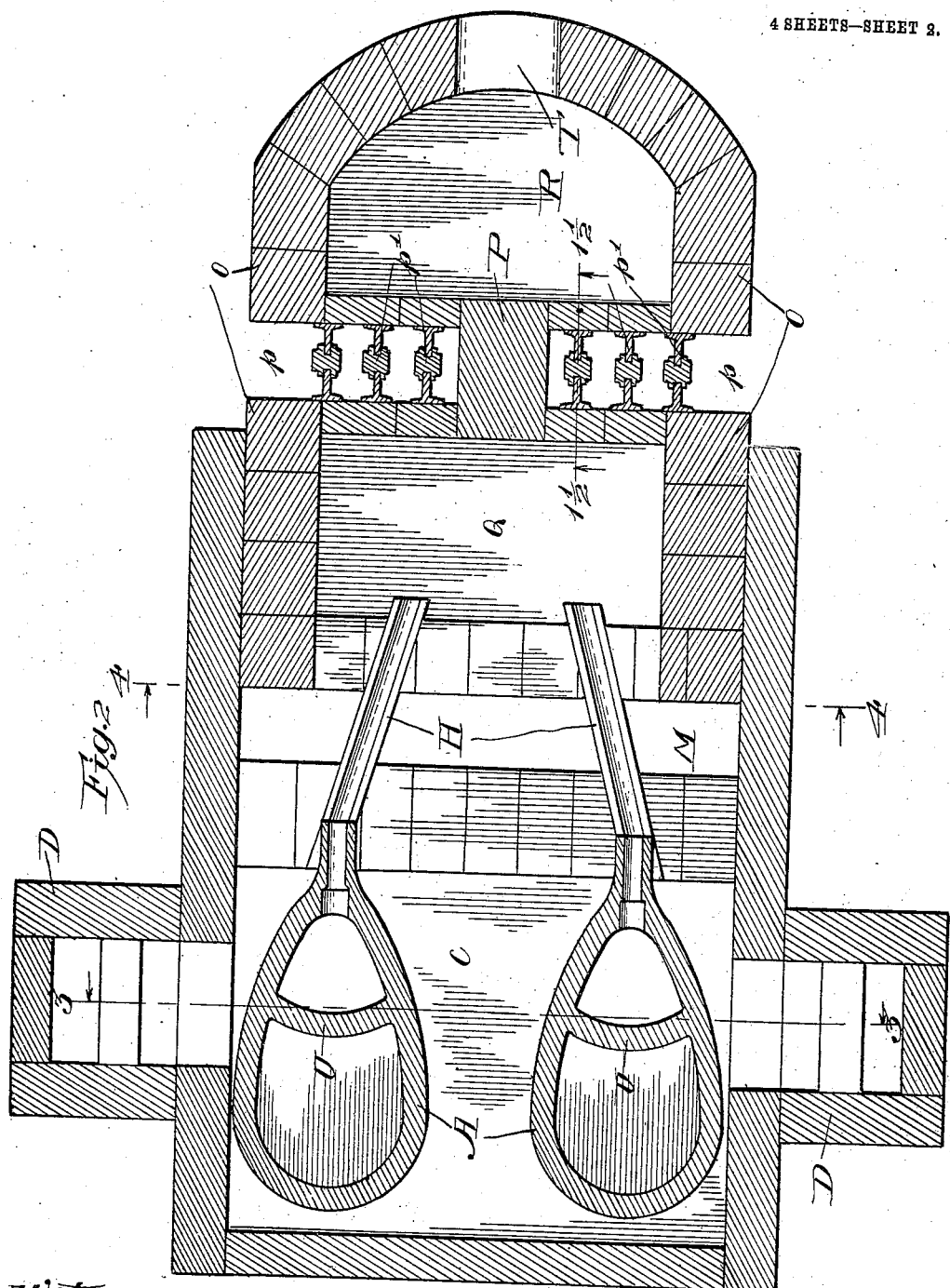

No. 849,021. PATENTED APR. 2, 1907.
S. O. RICHARDSON, Jr.
GLASS FURNACE.
APPLICATION FILED JULY 2, 1904.
4 SHEETS—SHEET 4.
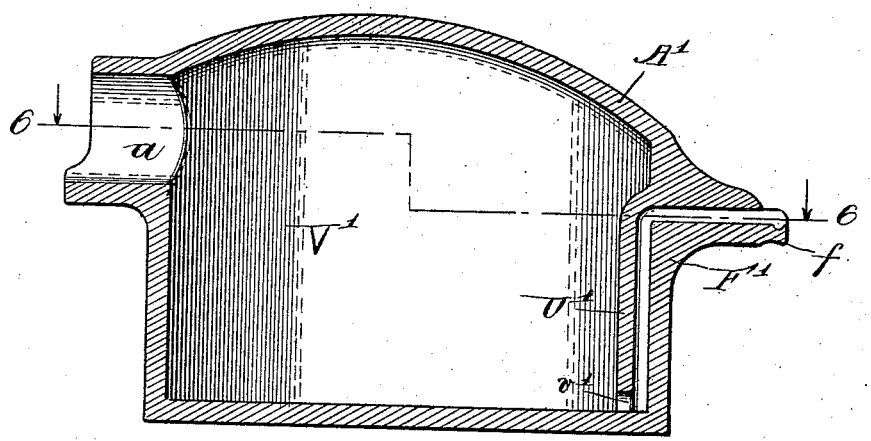
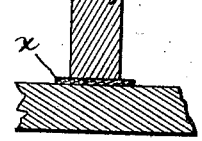
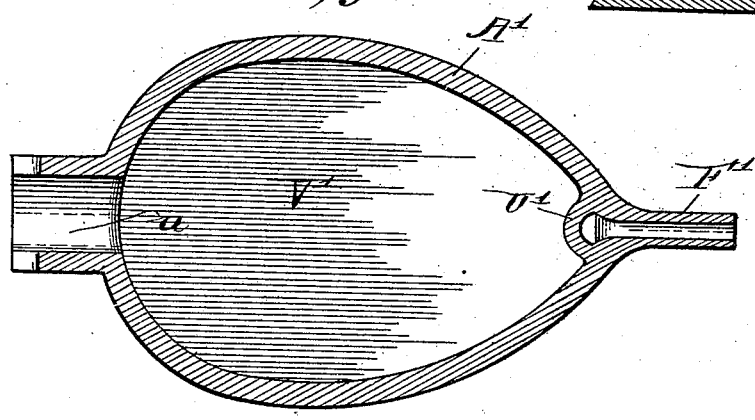
Witnesses:
Inventor:

UNITED STATES PATENT OFFICE.

SOLON OSMOND RICHARDSON, JR., OF TOLEDO, OHIO.

GLASS-FURNACE.

No. 849,021. Specification of Letters Patent. Patented April 2, 1907.

Application filed July 2, 1904. Serial No. 215,053.

*To all whom it may concern:*

Be it known that I, SOLON OSMOND RICHARDSON, Jr., a citizen of the United States, residing at Toledo, in the county of Lucas and State of Ohio, have invented certain new and useful Improvements in Glass-Furnaces, of which the following is a specification.

My invention relates to improvements in glass-furnaces of the type shown in my Patent No. 756,409, issued April 5, 1904.

The object of my present invention is to simplify and improve upon the construction of the type of furnace shown in that patent. These and such other objects as may hereafter appear are attained by the devices shown in the accompanying drawings, in which—

Figure 1 is a longitudinal sectional view of my present improvement applied to a glass-furnace. Fig. 1½ is a detail on the line 1½ 1½ of Fig. 2 looking in the direction indicated by the arrows. Fig. 2 is a horizontal sectional view thereof on the line 2 2 of Fig. 1 looking in the direction indicated by the arrows. Fig. 3 is a view on the line 3 3 of Fig. 2 looking in the direction indicated by the arrows. Fig. 4 is a view on the line 4 4 of Fig. 2 looking in the direction indicated by the arrows. Fig. 5 is a vertical sectional view of my improved form of pot. Fig. 5½ is an enlarged detail of a portion of a pot bottom and partition, and Fig. 6 is a horizontal sectional view of said pot on the line 6 6 of Fig. 5 looking in the direction indicated by the arrows.

Like letters of reference indicate the same parts in the several figures of the drawings.

In the drawings my invention is shown as embodied in a furnace comprising two melting-pots A, which are mounted under the main arch B, which extends over the heating-chamber C, to which heat is supplied in any suitable manner—as, for example, by means of the regenerators D of familiar form.

The pots are provided with feed-openings a, which open outside of the heating-chamber C and may be conveniently closed by blocks E. The pots A are also provided with conduits or spouts F, which open out of said pots at the metal-line thereof and discharge within the furnace, and preferably at a distance above the bottom of the pots.

The pots A are mounted upon a bench G. The spouts F preferably discharge into troughs or conduits H, which lead into the plaining-chamber I of the furnace beneath the arch J.

The heating-chamber C and the plaining-chamber I are separated from each other by walls K L, between which and beneath the troughs H extends an air-port M.

The furnace as a whole is supported in the familiar manner upon I-beams N, affording an air-space beneath the bottom of the furnace, thereby making the furnace metal-tight in the usual manner because metal, working between the blocks O will be congealed by the atmosphere. The air-port M therefore serves to make of the wall L a metal-tight partition, as between the heating-chamber C and the plaining-chamber I. Consequently since the metal-line in the plaining-chamber I is below the top of the troughs H the pots A are not accessible to the metal within the plaining-chamber.

The pots A may be mounted at any desired level so long as there is sufficient fall between the outlet from the pots A and the metal-line in the chamber I to permit the metal to flow from the pots A into the chamber I. This arrangement permits the construction of the arches B and J at somewhere near the same level, so as to afford a free radiation of heat from the heating-chamber C into the plaining-chamber I.

The plaining-chamber I is divided by a wall P into a receiving-chamber Q and a working chamber R, which are connected by a port or passage S through the wall P. Metal is worked out of the working chamber R through the working opening T, which may be closed when not in use in any convenient manner.

The pots A may be of any suitable form whereby the batch may be fed thereto from outside of the heating-chamber C, may be reduced therein without being subjected to direct contact with the reducing gases, and may be continuously conducted therefrom.

In Fig. 1 the pot is divided by a partition U into a receiving or reducing chamber V and a plaining-chamber $v$, connected with each other by a port $v'$ in the bottom of the partition U, the spout F opening out of the chamber $v$.

In Figs. 5 and 6 substantially the entire interior of the pot is occupied by the reducing-chamber V', which is separated from the spout F' by the partition U', the space between the partition U' and the rear wall of the pot A' affording a metal-conduit leading to the spout F' and communicating with the reducing-chamber by means of a port $v'$ in the bottom of the wall or partition U'. In this form of my improved pot it will be seen that the spout F' projects straight outwardly instead of downwardly, as in Fig. 1, and is provided with a downwardly-projecting lip $f$ to insure the flow of the metal out of the spout F' directly downwardly, and thus to offset any tendency which the metal might otherwise have to flow backwardly along the spout F'. It is obvious that with this arrangement the pot as a whole may be mounted at a considerably lower level than with the construction shown in Fig. 1, in which event the arch B may be arranged more nearly on a level with the arch J, thus promoting the free radiation of heat from the chamber C into the chamber I.

In constructing these pots, which, as is known in this art, are built up of unbaked clay, difficulty has been found to accommodate the unequal contraction of the pot and of the partition or wall therein, the pot drying freely from the outside and the wall being in an inclosed space. To overcome this difficulty, I have constructed the pots in the manner shown, to wit: The partitions U and U' are in the segment of a circle reaching from wall to wall of the pot and are built upon any suitable foreign substance which is interposed between the base of the partition and the bottom of the pot, as is most clearly indicated at $x$ in Figs. 1 and 5½. I have found that paper answers the purpose admirably. Having laid the paper on the bottom of the pot which is being built up, the wall is built up upon this paper and extending within the arc of a circle from side to side of the pot. Consequently as the pot dries, there being no connection between the bottom of the partition and the bottom of the pot, they are free to contract differently and to have a slight movement with relation to each other, while because of the concavo-convex form of the wall U the more rapid contraction of the walls of the pot is provided for, because the ends of the wall U may be bent toward each other sufficiently for this purpose without injuring the wall.

In applying the dome or top to the pot paper may be interposed between the top of the wall U and the top of the pot, if desired, or the walls of the pot and the wall U may be allowed to dry sufficiently before the top of the pot is applied.

It will be understood that in the drawings I have shown my present invention in what I now consider to be its improved form; but many departures in detail may be made from such embodiment without departing from the spirit of my invention, which rests mainly in the arrangement of the respective parts, whereby the heating-chamber is separated from the plaining-chamber by a metal-tight partition in the mounting of the pot at a lower level, whereby a freer radiation from the heating-chamber to the plaining-chamber is obtained, and in the structure of the pot itself, as well as in the details of the structures as a whole, which are shown in the drawings as above described.

The wall P need only extend above the metal-line in the plaining-chamber I, and in the construction shown in the drawings, while it is solid along the central section thereof, (shown in Fig. 1,) it is hollow at each side of that central section, the hollow space within the wall opening downwardly and forming an air-port $p$, across which extends braces $p'$, as shown in Fig. 1½.

It will be noted that in the preferred structure the passage S through the wall P extends through the body of the block which forms the solid central section of said wall.

I claim—

1. A glass-furnace which comprises a heating-chamber and a plaining-chamber, in free communication with each other above the metal-line of the plaining-chamber, a melting-pot mounted in the heating-chamber, a metal-conduit leading from the outlet of the melting-pot into the plaining-chamber, said furnace being provided with an air-port interposed between the heating-chamber and the plaining-chamber, below said conduit.

2. A glass-furnace, comprising a heating-chamber, a substantially-closed melting-pot mounted in said heating-chamber, said pot being provided with a feed-port opening outside of said heating-chamber, and with an outlet-port discharging into the furnace, said furnace being also provided with a plaining-chamber, a conduit arranged to receive metal from said pot and to take it into said plaining-chamber, said furnace being also provided with an air-port interposed between the plaining-chamber and the heating-chamber, and below the level at which said conduit crosses said air-port.

3. In a glass-furnace, the combination with a heating-chamber, a melting-pot mounted in said chamber and having a feed-in opening at one end and arranged to discharge into said heating-chamber, a plaining-chamber, means for conducting the product of said pot from the heating-chamber to the plaining-chamber, and means for passing the flame and gases through said heating-chamber and around said pot, so as to reduce the contents of said pot and maintain the fluidity of the contents of said plaining-chamber.

SOLON OSMOND RICHARDSON, Jr.

Witnesses:
J. H. WRIGHT,
F. E. WOLF.